(12) United States Patent
Dessaud

(10) Patent No.: US 8,102,492 B2
(45) Date of Patent: Jan. 24, 2012

(54) VERTICAL ALIGNMENT LIQUID CRYSTAL DISPLAY DEVICE WITH IMPROVED APERTURE RATIO

(75) Inventor: Nathalie Magali Danielle Dessaud, Eindhoven (NL)

(73) Assignee: Chimei Innolux Corporation, Chu-Nan (TW)

( * ) Notice: Subject to any disclaimer, the term of this patent is extended or adjusted under 35 U.S.C. 154(b) by 260 days.

(21) Appl. No.: 12/290,239

(22) Filed: Oct. 27, 2008

(65) Prior Publication Data
US 2009/0135360 A1    May 28, 2009

Related U.S. Application Data

(60) Provisional application No. 60/986,276, filed on Nov. 7, 2007.

(51) Int. Cl.
*G02F 1/1337*    (2006.01)
*G02F 1/1343*    (2006.01)

(52) U.S. Cl. .......................... 349/129; 349/143
(58) Field of Classification Search .............. 349/129
See application file for complete search history.

(56) References Cited

U.S. PATENT DOCUMENTS

| | | | |
|---|---|---|---|
| 5,114,872 A | 5/1992 | Roselle et al. | |
| 5,608,556 A | 3/1997 | Koma | |
| 6,407,791 B1 | 6/2002 | Suzuki et al. | |
| 6,424,398 B1 | 7/2002 | Taniguchi | |
| 6,917,406 B2 | 7/2005 | Yang | |
| 7,295,274 B1 | 11/2007 | Wu et al. | |
| 7,408,605 B2 * | 8/2008 | Kwag et al. | 349/129 |
| 2005/0206795 A1 * | 9/2005 | Shin et al. | 349/43 |
| 2007/0070282 A1 * | 3/2007 | Shibahara et al. | 349/141 |

OTHER PUBLICATIONS

Chandrasekhar, S., "Liquid Crystals", 2nd Edition, Cambridge University Press (1992), pp. 162-167.
Roosendaal, S.J., et al., "10.3: One-Dimensional Modelling to Predict Causes & Trends of Reverse Flow Effects in Vertically Aligned Nematic LCDs", 2006 SID, IDRC, pp. 127-130.
Dessaud, N., "Towards a Better Understanding of the Reverse Flow Effect in Multi-Domain VA-LCDs", LCT7-2, IDW '06, pp. 651-654.
Kim, S., et al., "New Technologies for Advanced LCD-TV Performance", Journal of the SID Dec. 4, 2004, pp. 353-359.
Shibazaki, M., et al., "57.5L: Late-News Paper: MVA Mode with Improved Color-wash-out for Mobile Application", SID '07 Digest, pp. 1665-1668.

* cited by examiner

*Primary Examiner* — Mark Robinson
*Assistant Examiner* — Michael Inadomi
(74) *Attorney, Agent, or Firm* — Liu & Liu

(57) ABSTRACT

A liquid crystal display device includes a liquid crystal layer, a common electrode, and an electrode set. The liquid crystal layer is placed between said common electrode and the electrode set, and the electrode set is provided for switching the liquid crystal layer. The electrode set includes a first electrode for switching a first area of the liquid crystal layer and a second electrode for switching a second area of the liquid crystal layer. Particularly, the second area includes at least a part of the area of the liquid crystal layer that the first area does not include. The first electrode has a shape which in cooperation with the second electrode allows alignment of the LC molecules in substantially two orthogonal directions. A method is provided to get rid of the circular polarizers which provide a good on-axis aperture ratio but which show reduced off-axis performance compared to linear polarizers.

11 Claims, 20 Drawing Sheets

VERTICAL ALIGNMENT LIQUID CRYSTAL DISPLAY DEVICE WITH IMPROVED APERTURE RATIO

CROSS REFERENCE TO RELATED APPLICATIONS

This application claims the benefit of U.S. Provisional Application No. 60/986,276, filed on Nov. 7, 2007.

BACKGROUND OF THE INVENTION

1. Field of the Invention

The present invention relates to a liquid crystal display, and particularly to a vertical alignment (VA) liquid crystal display device.

2. Description of the Related Art

A liquid crystal display (LCD) is one of the most widely used flat panel displays. An LCD includes two panels provided with field-generating electrodes such as pixel electrodes and a common electrode and a liquid crystal (LC) layer sandwiched there between. The LCD displays images by applying voltages to the field-generating electrodes to generate an electric field in the LC layer, which determines orientations of LC molecules in the LC layer to adjust polarization of incident light.

A commonly used LCD mode is a vertical alignment (VA) mode LCD (VA-LCD), which aligns LC molecules such that the long axes of the LC molecules are perpendicular to the panels in absence of electric field. The VA-LCD mode exhibits several advantages such as: good viewing angle performance, high contrast ratio due to its excellent black state (independent of temperature or chromatic), low operating voltages, and a cost effective fabrication process (as it is a rubbing free process).

The good viewing angle properties are obtained by creating multi-domains in the pixel design. This can be done by using mechanical protrusions, as disclosed in U.S. Pat. No. 7,295,274, or slits in the ITO electrodes, as disclosed in U.S. Pat. No. 6,424,398, or a combination of both. The slits create fringing fields which direct the switching of the LC. The slope of the protrusions has a similar effect. From their initial homeotropic orientation, which is perpendicular to the glass substrate, the specially chosen dielectrically negative LC molecules tend to reorient perpendicular to the electrical field. With protrusions or slits, the molecules tilt in a defined direction as an electrical field is applied.

The switching time of VA mode LCD is limited by the material and cell configuration. But it is also limited by what is referred to as the reverse flow effect (or backflow effect). This phenomenon occurs if a too high voltage is applied to a VA cell and inversely results in a longer switching time. This phenomenon has been described in the following references: [1] De Gennes and Prost, Physics of Liquid Crystals 2nd Ed, Oxford; Clarendon Press, (1995); [2] Chandrasekar S., Liquid Crystals, 2nd edition, Cambridge University Press, (1992); [3] Roosendaal, Dessaud, Hector, Hughes, Boer, IDRC conference proceeding, 10-3, 127-130 2006; [4] Dessaud, Roosendaal, Hector, Hughes, Boer, IDW'06 Digest, LCT7-2, 651-654, 2006; [5] Sang Soo Kim, Brian H. Berkeley, Kyeong-Hyeon Kim, and Jang Kun Song, J. Soc. Inf. Display 12, 353 (2004).

It is known that a more uniform switching could be obtained by increasing the number of domains in a display. However, the approaches in the prior art would unfavourably reduce the total aperture ratio as, because of the shape of the electrode, some areas of LC will never switch and this will reduce the total aperture ratio. Furthermore, when the pixel size gets smaller, the size of the areas of an LC cell that will never switch will remain the same. As a result the percentage of never switching area will increase, resulting in a reduction of total aperture ratio.

The VA-LCD mode is very interesting in both transmissive and reflective mode making transflective displays possible. Optical foils play an important role in the final front of screen performance of the display.

A good reflective VA-LCD can be obtained by placing a circular polarizer on top of the display and a reflector after the LC-layer. A circular polarizer can be obtained by combination of a linear polarizer and a quarter wave plate between the linear polarizer and the LC layer. In its OFF mode, the display appears black and in its ON mode, maximum transmission can be reached. FIG. 3a shows the simulated optical response of a 45 µm pixel between crossed polarizers 0°-90°. FIG. 3b shows the simulated optical response of a 45 µm pixel between crossed polarizers 45°-135° and FIG. 3c shows the simulated optical response of a 45 µm pixel between circular polarizers. Finally, FIG. 3d shows the director profile of the LC molecules in a prior art 45 µm pixel. It is clear that, circular polarizers provide the best aperture ratio in combination with a 45 µm pixel.

In transflective displays, the need to have a good working reflective area (normally black) makes the use of circular polarisation very interesting. A good match between transmission and reflective mode curves can be obtained by using the double cell gap approach.

There are several reasons to prefer linear polarizers over circular polarizers. They provide higher contract ratio, less retardation films, thinner polarizer stack, lower manufacturing cost and stronger against the deviation of the retardation film properties. Furthermore, it is commonly known that the off-axis performance of circular polarizers is lower than the off-axis performance of linear polarizers. Furthermore, in transmissive mode the quarter lambda wave plate is not necessary. By omitting the quarter lambda wave plate in a transflective display, the off-axis performance can be improved.

For very small pixel sizes and especially for squared pixels, the LC alignment can not allow the use of linear polarizers as the loss in aperture ratio is too high when a "flower type" optical response occurs. FIG. 4a-d shows simulated optical responses from top to bottom of a 100 µm pixel, a 60 µm pixel, a 45 µm pixel and a 25 µm pixel between two crossed polarizers placed at 45°-135°. As can be seen, the loss in aperture ratio increases as the pixel size decreases.

In Shibazaki-san et. al, "57.5L: Late-News Paper: MVA Mode with Improved Color-wash-out for mobile Applications", Society for information display 2007 International symposium, SID 07 DIGEST, 1665-1668, a new MVA technology for wider viewing angle is described. A new pixel structure with an optimized ITO slit design on the Colour Filter (CF) side is described which increases the transmittance of a transmissive MVA mode with a linear polarizer. The ITO slit provides an alignment of the LC molecules in four directions (two orthogonal directions) and therefore allows the use of linear polarizers in such configuration. The disadvantages of etching the colour filter substrate are: stricter ITO etching design rules (i.e. the ITO slits and gap minimum size) than on the TFT substrate, and difficult to etch the CF substrate without damaging the colour filters.

FIG. 5a shows an embodiment of an ITO hole 52 in the electrode 50 on the CF side. FIG. 5b shows the director profile of the LC molecules in a cell with said ITO hole. FIGS. 5c-d show the optical response of such a cell with ITO hole on the CF side between circular polarizers and crossed polarizers 0°-90°, respectively. The black spots in the middle of the cells corresponds to the part of the LC layer that is not switched as an electric field is missing at the location of the ITO hole in the electrode 50 on CF side. The unswitched area of LC layer is related to the size and the shape of the ITO hole. This effect decreases the aperture ratio of the LCD.

Therefore, it is desirable to have a LCD design which can overcome some of the disadvantages of the known designs.

BRIEF SUMMARY OF THE INVENTION

It is an object of the invention to provide an improved LCD device. More specific, it is an object of the invention to provide an LCD device with improved aperture ratio. It is another object of the invention to provide an LCD device which allows the use of linear polarizers, which improves off-axis-performance.

Furthermore, it is another object of the invention to provide an LCD device with reduced cost price of the display by reducing the number of foils necessary and the amount of process steps.

Furthermore, it is still a further object of the invention to provide an LCD device with improved switching times of the LC.

Another object of the present invention is to provide an LCD in which the backflow effect is eliminated or reduced.

The object of the present invention has been achieved by a liquid crystal display device according to the independent claim. Advantageous embodiments and further embodiments of the present invention are subject of the dependent claims.

A liquid crystal display device (LCD) according to the invention comprises a liquid crystal layer, comprising liquid crystal (LC) molecules, a common electrode, and an electrode set for switching said liquid crystal layer. The liquid crystal layer is placed between said common electrode and said electrode set. The electrode set is provided for switching the LC layer. The electrode set comprises a first electrode provided for switching a first area of said liquid crystal layer and a second electrode provided for switching a second area of said liquid crystal layer. The second area includes at least a part of the area of said liquid crystal layer that said first area does not include. Furthermore, the first electrode has a shape which in cooperation with the second electrode allows alignment of the LC molecules in substantially two orthogonal directions. Compared to the general VA-mode where squared pixels are used, the invention allows us to use linear crossed polarizers. The special shaped electrode in cooperation with the second electrode controls the LC orientation and therefore reduces the huge loss in aperture ratio due to the diversity of LC orientations when crossed polarizers are used.

In an embodiment of the invention, the first electrode has a cross shape. In another embodiment, the first electrode has a shape corresponding to the combination of a cross shape and rectangle shape and wherein the centre of the cross shape and rectangle shape coincides.

In an embodiment, the second electrode has a rectangle shape, which can be a square, which covers the LC-layer and in yet another embodiment, the first electrode and said second electrode together cover substantially all the area of said liquid crystal layer. In this way, the whole LC-layer can be switched.

In another embodiment, the second electrode has an opening coinciding with at least a part of said first electrode. In yet another embodiment, the common electrode has an opening coinciding with at least a part of the first electrode. This allows us to increase the design freedom.

The first electrode and the second electrode can be in the same plane or can be in two planes wherein the first and second electrode are separated by a dielectric layer.

In an embodiment the LCD device comprises a driver unit for driving the first and second electrodes. The first and second electrodes can be driven with different voltages and similar voltages.

In yet another embodiment, the LCD device comprises two or more sections and the common electrode and the first and second electrodes extend to allow alignment of the LC molecules in each of said one or more sections in substantially two orthogonal directions, wherein the shape and/or orientation of the first electrode in the two or more sections differ.

In still another embodiment, the LCD device is a transmissive LCD device and linear polarizers are disposed respectively on both outer surfaces of the LCD device, having polarization axes that are orthogonal to each other.

In another embodiment, the LCD device is a transflective LCD device, comprising reflective LCD cells and transmissive LCD cells. Linear polarizers are disposed respectively on both outer surfaces of the LC-layer corresponding to the transflective LCD cells. The linear polarizers have polarization axes that are orthogonal to each other.

Another aspect of the invention provides electronic device, comprising the LCD device according to the invention and a power supply connected to the LCD device to supply power to the LCD device.

A detailed description is given in the following embodiments with reference to the accompanying drawings.

BRIEF DESCRIPTION OF THE DRAWINGS

The present invention will be discussed in more detail below, using exemplary embodiments, with reference to the attached drawings, in which similar notations indicate similar elements.

DETAILED DESCRIPTION OF THE INVENTION

The present invention is useful for a vertical alignment (VA) LCD and will be described with reference to the accompanying drawings. However, those skilled in the art can understand that the present invention may, however, be embodied in many different forms and should not be construed as limited to the embodiments set forth herein.

The present invention is especially useful in a transmissive LCD or transmissive sections of a transflective LCD.

Figure 1:
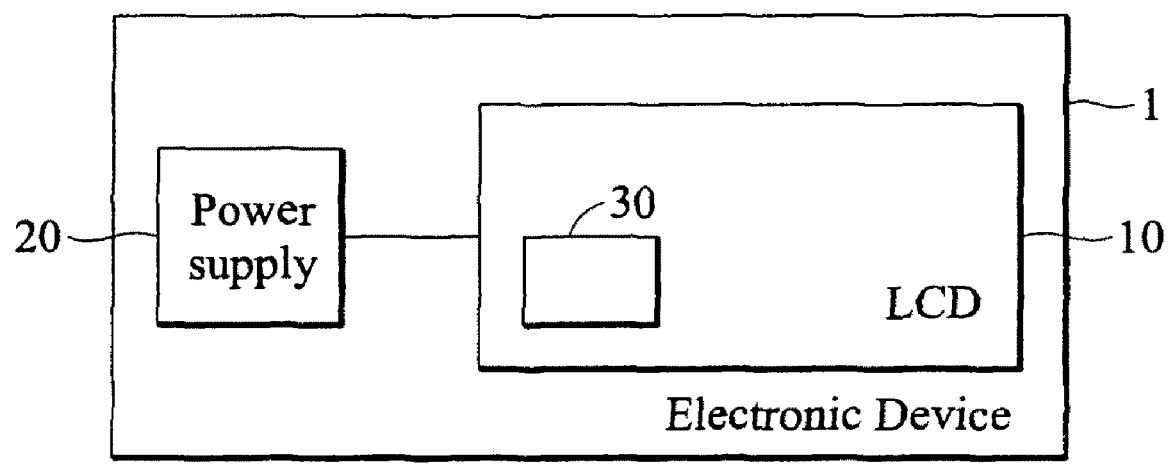
FIG. 1 is a block diagram of the electronic device according to an embodiment of the present invention.

FIG. 1 is a diagram of an electronic device 1 with an LCD 10 according to an embodiment of the present invention. The electronic device 1 also has a power supply 20 connected to the LCD 10 to supply power to the LCD 10. In this embodiment, the LCD 10 is a colour or monochromic image display integrated into the electronic device 1. As known to those skilled in the art, the electronic device 1 can be a mobile phone, a personal digital assistant (PDA), a notebook computer, a desktop computer, a television, a car media player, a portable video player, digital camera, global positioning system (GPS), avionics display, and any other apparatus comprising an LCD.

Figure 2A:
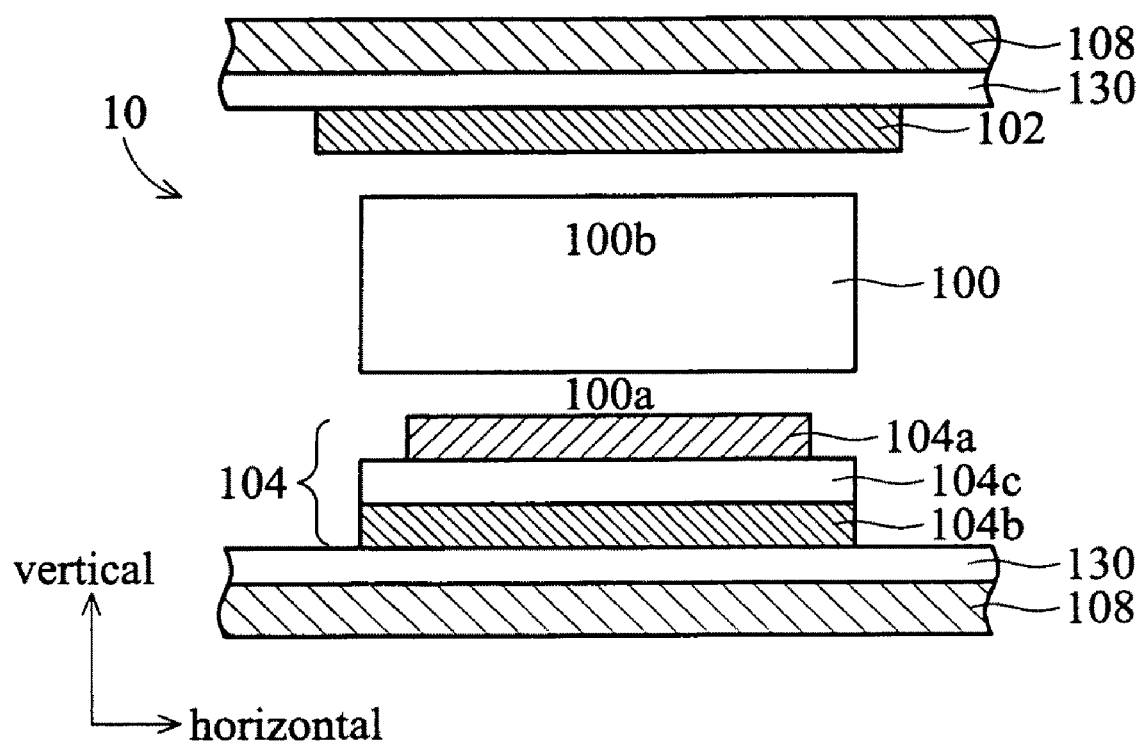
FIG. 2*a* exemplarily shows a profile of LCD pixel cell according to an embodiment.
Figure 2B:
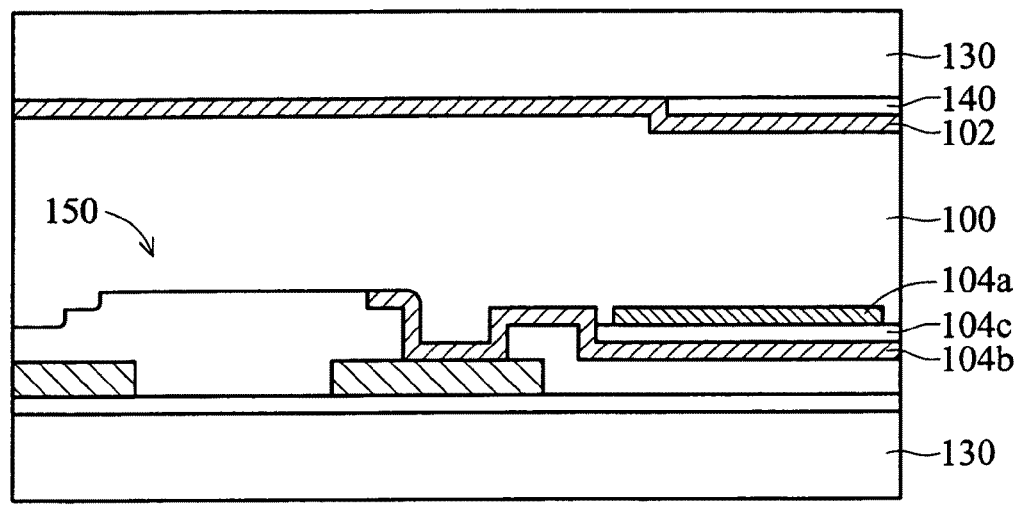
FIG. 2*b* exemplarily shows a profile of components of LCD pixel cell according to an embodiment.

According to an embodiment of the present invention, FIG. 2a further illustrates the profile of an LCD 10. The LCD 10 includes a liquid crystal (LC) layer 100, a common electrode 102, an electrode set 104, two glass substrates 130 and two polarizers 108. The polarizers 108 can be circular polarizers or crossed polarizers. The LCD 10 may have many cells, but FIG. 2a illustrates only one cell of the LCD 10 to explain the present invention. In this example, the pixel cell, corresponding to a sub pixel, can have a size of 40 μm×40 μm and a thickness of 4.15 μm. Note that the pixel cell can have other sizes like 20 μm×20 μm, 30 μm×30 μm, 39.5 μm×39.5 μm, 40 μm×80 μm or any other size and the thickness can be any suitable one greater than 1.5 μm. As shown, the LC layer 100, where the LC molecules are vertically aligned (not shown in FIG. 2a), is sandwiched between the common electrode 102 and the pixel electrode set 104, which in turn are sandwiched between the two glass substrates 130, which in turn are sandwiched between two polarizers 108. The electrode set 104, which is placed on the Thin Film Transistor (TFT) (not shown) side, is provided for switching the LC layer 100. Note that the LCD 10 may include other components, such as substrates 130, colour filters (CF)140, and a TFT 150, as shown in FIG. 2b.

The common electrode 102, the LC layer 100, and the pixel electrode set 104 form a liquid crystal capacitor, which stores applied voltages after turn-off of the TFT(s) (not shown). The pixel electrode set 104, supplied with the data voltages, generates electric fields in cooperation with the common electrode 102, which reorients LC molecules of the LC layer 100. The common electrode 102, which can be a conventional common electrode, can be made of ITO or IZO. The pixel electrode set 104, like conventional pixel electrode but with a different structure, can be made of ITO or IZO. As shown in FIG. 2a, the electrode set 104 includes a first electrode 104a, a second electrode 104b, and a dielectric layer 104c (e.g., a SiOx or SiN layer with a thickness of, for example, 0.1 μm or 0.25 μm) placed between the first and second electrodes 104a, 104b. In this embodiment, the first electrode 104a and second electrode 104b are plane electrodes. Those skilled in the art will understand that the present invention is not limited to an electrode set 104 with two electrodes but can also be applied to electrode sets 104 which have more than two electrodes and more dielectric layers to separate the electrodes.

The first electrode 104a and the second electrode 104b are driven by a driver unit 30. The first electrode 104a and the second electrode 104b can be driven with similar or different voltages or driven according to different time sequences (e.g., be turned on at different time) to achieve the desired switching effect and orientation of the LC-molecules. In one scenario, a voltage of 5 V is first applied to the first electrode 104a, and after 5 milliseconds (ms), a voltage of 6 V is applied to the second electrode 104b. In another scenario, a voltage of 4 V is first applied to the first electrode 104a, and after 5 ms, a voltage of 6 V is applied to the second electrode 104b. Or a same voltage of 5 V can be applied to both the first electrode 104a and the second electrode 104b, but the first electrode 104a is turned on 5 ms prior to the second electrode 104b. Nevertheless, that using only one TFT and one storage capacitor to respectively drive the first electrode 104a and the second electrode 104b is also covered by the present invention.

According to the invention, the driving unit 30 supplies voltages to the first electrode and second electrode to generate a fringing field to provide in the LC-layer 100 at least two domains, wherein the orientation of the LC molecules in each of said at least two domains is substantially in one direction and the orientation of the LC-molecules in a domain of said at least two domains is orthogonal with respect to the orientation of the LC molecules in another domain of said at least two domains. In other words, to obtain the advantage of the invention, at least two domains have to be provided wherein the orientation of the LC molecules in the at least two domains are perpendicular with respect to each other. Preferably, the LC-layer of a cell comprises four different domains, wherein the orientation of the LC-molecules of the four domains differs from each other and is in perpendicular directions.

Figure 6A:
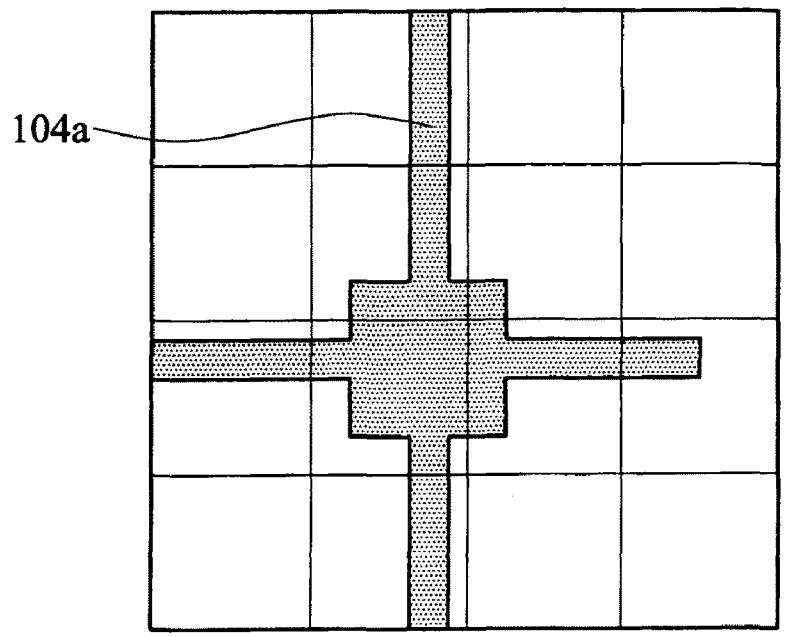
FIG. 6*a* shows an embodiment of a first electrode according to the invention.
Figure 6B:
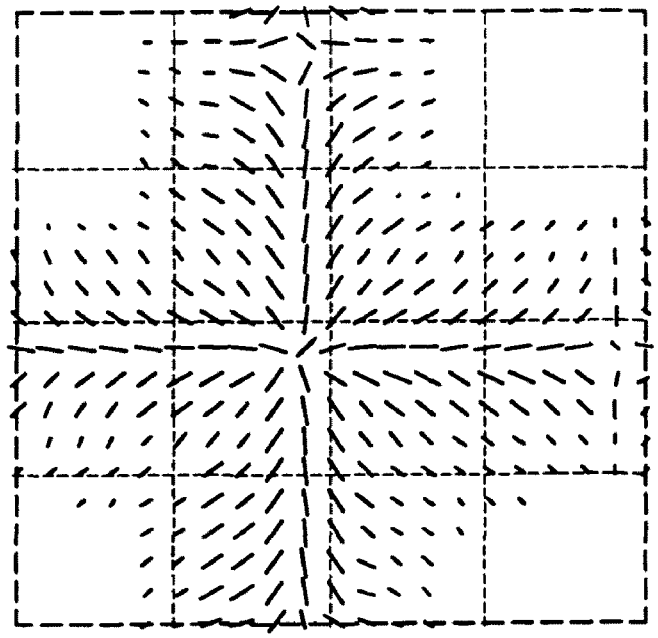
FIG. 6*b* shows the director profile of the LC molecules in a cell with the first electrode shown in FIG. 6*a* in the centre of the cell.
Figure 6C:
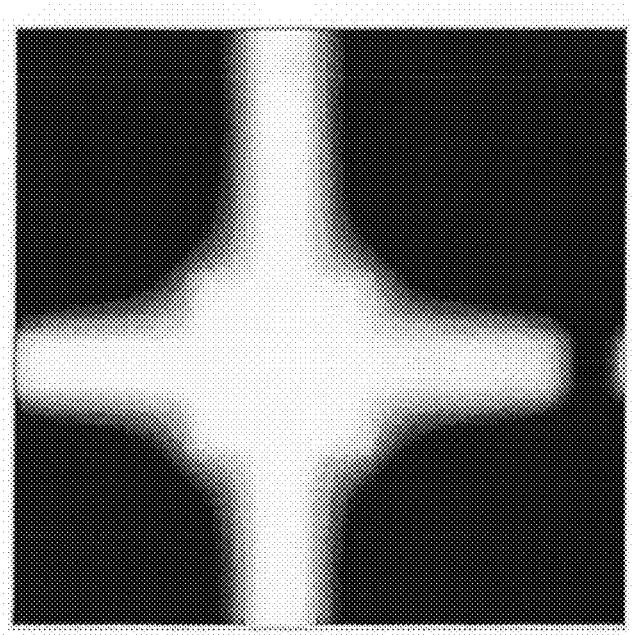
FIG. 6c-d show the simulated response of a cell with the first electrode shown in FIG. 6a between circular polarizers and crossed polarizers 0°-90°, respectively.
Figure 6D:
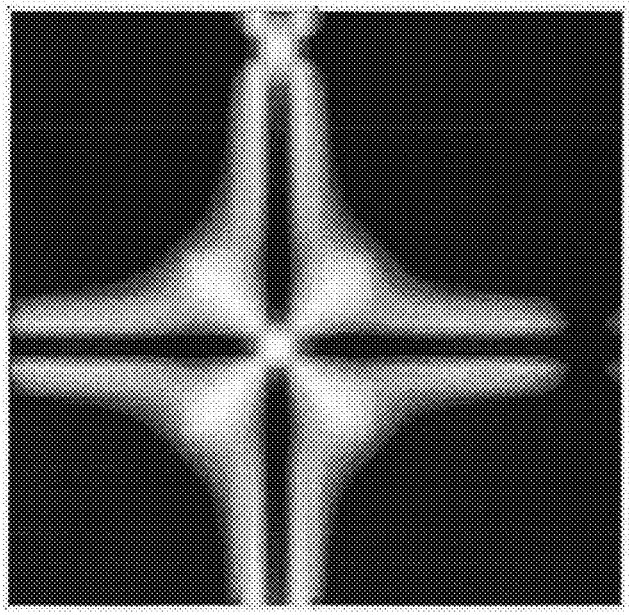

Compared with the conventional design for pixel electrode (e.g., as a single square electrode to cover the whole area of the LC layer), the first electrode 104a may have a particular shape for switching the LC layer 100 (as later shown in the figures). In an embodiment, the first electrode 104a has a fringing structure (not shown in FIG. 2a) and generates a fringing field for switching a first area 100a instead of the whole area of the LC layer 100. The switched area of the LC layer 100a is related to the size and the shape of the first electrode 104a and the common electrode. For example, a small-size first electrode 104a can only effectively switch the LC molecules of the LC layer 100 in a small area 100a, and the shape of the switched area 100a more or less looks like the first electrode 104a. FIG. 6a shows an embodiment of the first electrode 104a and FIG. 6b shows the corresponding director profile of the LC molecules. Furthermore, FIG. 6c shows the simulated response of a cell with the first electrode shown in FIG. 6a between circular polarizers, whereas FIG. 6d shows the simulated response of the same cell between crossed polarizers 0°-90°.

Regarding the shape of the first electrode 104a, the present invention does not like to specify any specific ones, but it has at least two parts extending in perpendicular horizontal directions, to provide the multiple and diverse domains switching effect. For example, as shown in FIG. 6a, the first electrode 104a has a shape corresponding to the combination of a cross shape and rectangle shape, thus having four parts extending in different horizontal and perpendicular directions. Moreover, when incorporated into the LCD 10 of FIG. 2a, the first electrode 104a can be placed within a square of 35 μm×35 μm, which corresponds to the size of the second electrode 104b in one embodiment.

Meanwhile, in order to gain some uniformity for the switching, the first electrode 104a can have a symmetrical shape as shown in the examples. The symmetrical shape can be a line or a point.

Those skilled in the art should understand the arrangement of the aforementioned first electrode 104a can be directed to, but not limited to, the fast switching by reducing the backflow effect. The increased number of edges of the first electrode 104a effectively reduces the backflow effect. From FIGS. 6c and 6d can be seen that the first electrode does not provide sufficient aperture ratio on its own. It is desired to maintain a high aperture ratio of the LC cell at the same time. For that, a second electrode 104b of the electrode set 104 is configured to switch a second area 100b of the LC layer 100, as shown in FIG. 2a. Note that in the present invention, the second area 100b may or may not overlap the first area 100a of the first electrode 104a, as long as the second area 100b includes at least a part of the area of the LC layer that the first area 100a does not include, so that those LC molecules not affected by the first electrode 104a can be led by the electric field of the second electrode 104b. Also note that the "boundary" of the first area 100a and the second area 100b may be judged by a predetermined transmission at a given time, e.g., 20 or 100 ms, after the voltage(s) is applied to the first electrode 104a and to the second electrode 104b. Therefore, by arranging the first electrode 104a along with the second electrode 104b, a higher aperture ratio is obtained than the one resulted from the first electrode 104a only.

Figure 7A:
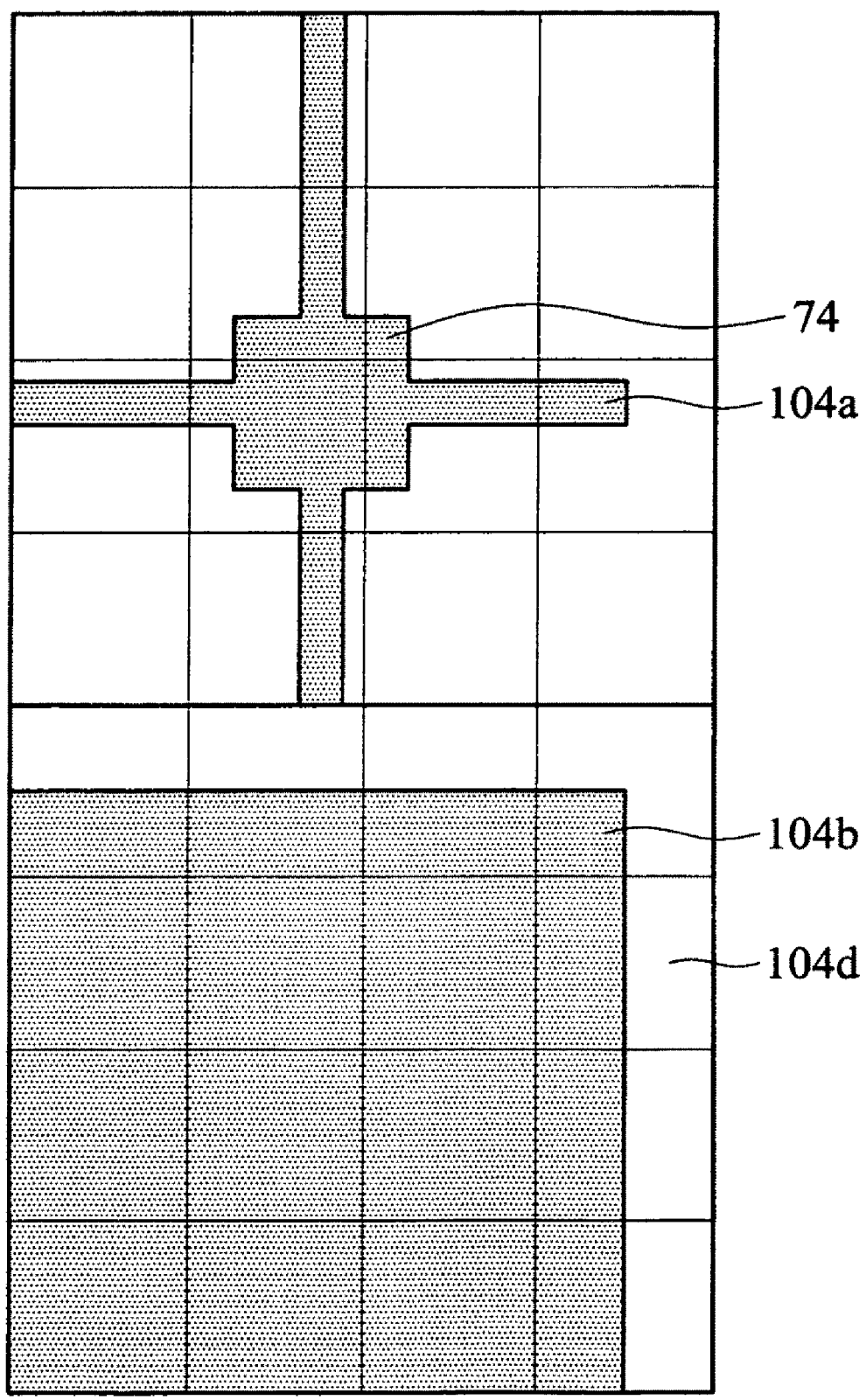
FIG. 7a shows a set of electrodes according to a first embodiment of the invention.
Figure 7B:
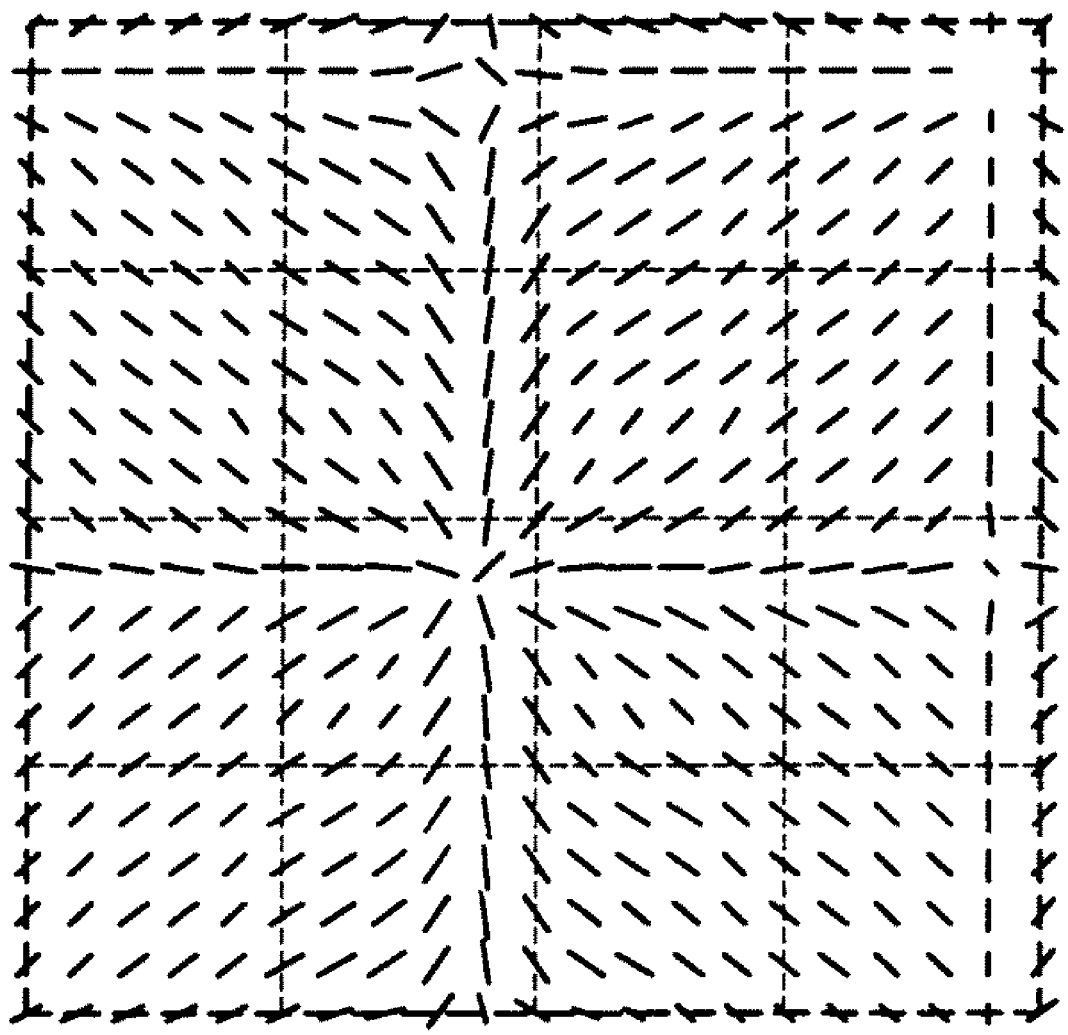
FIG. 7b shows the director profile of the LC molecules in a cell with the set of electrodes shown in FIG. 7a in the centre of the cell.

FIG. 7a shows a set of electrodes according to a first embodiment of the invention. An electrode set can be configured for a pixel cell of an LCD device 10. The first electrode 104a has a shape corresponding to the combination of a cross shape and a rectangular shape and wherein the centers 74 of the cross shape and the rectangular shape coincide. The second electrode 104b substantially covers all the area of the LC layer 100. Only a small area 104d is not covered by the second electrode 104b. This area forms a boundary between the second electrodes of neighboring pixel cells. The width of the area along sides of the cell is in a range from 2 μm up to about 15 μm. The first and second electrodes are placed in this embodiment above each other, wherein the first electrode 104a is between the LC layer 100 and the second electrode 104. FIG. 7b shows the director profile of the LC molecules in a cell with the set of electrodes shown in FIG. 7a. The LC molecules in the centre of the cell are aligned in substantially two orthogonal directions. When the LCD is switched on, the LC-layer 100 comprises four domains, wherein in each domain the LC molecules are mainly aligned in one of the two orthogonal directions.

Figure 7C:
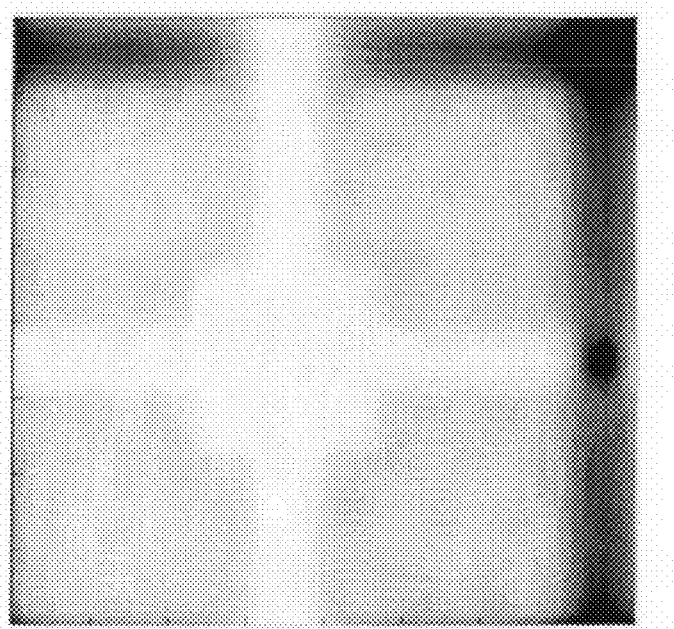
FIG. 7c-d show the simulated response of a cell with the set of electrodes shown in FIG. 7a between circular polarizers and crossed polarizers 0°-90°, respectively.
Figure 7D:
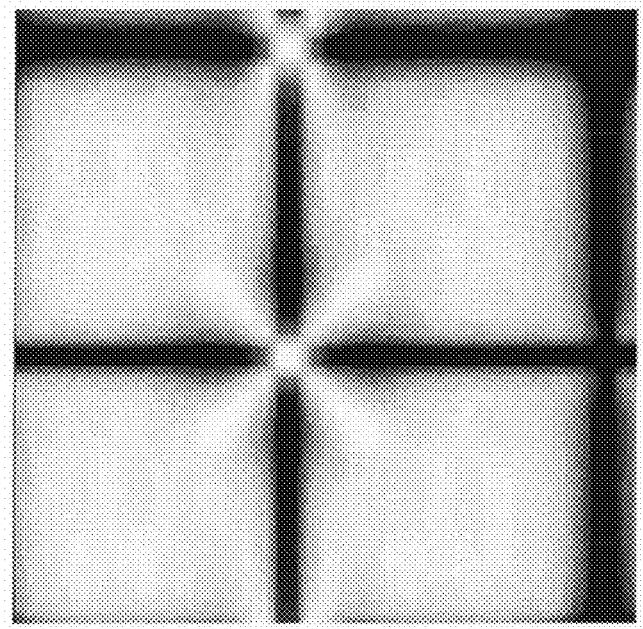

FIGS. 7c-d show the simulated response of a cell with the set of electrodes shown in FIG. 7a between circular polarizers and crossed polarizers 0°-90°, respectively. It can be seen that the aperture ratio is significantly improved by applying the second electrode.

In this embodiment, wherein the first and second electrode 104a, 104b are separated by a dielectric layer, the voltage applied to the first and second electrodes can be the same voltage. The distance between the first electrode 104a and the common electrode 102 and the distance between the second electrode 104b and the common electrode 102 is sufficient to apply different switching voltages across the LC layer 100. This allows providing the four domains. Having four domains, wherein the directions of the LC molecules are orthogonal with respect to each domain allows us to use linear (crossed) polarizers instead of circular polarizers, without losing much aperture ratio on the axis. The use of linear polarizers, allows us to reduce production costs of transmissive LCD-devices. Furthermore, this improves the off-axis performance. The use of a set of electrodes improves the aperture ratio with respect to the ITO hole in the electrode on the CF side. As both the common electrode and set of electrodes substantially covers all the area of the LC-layer at both sides, i.e. without holes in the effective area, a large area of the LC-molecules between the common electrode and set of electrodes will be switched. A small stripe 104d along the area covered by the first and second electrodes, which forms a boundary between the sets of electrodes of neighboring pixel cells, is almost not switched in the LC-layer.

Compared with the first electrode 104a, the shape of the second electrode 104b is less important and is less related to the backflow effect. In case, the first electrode 104a and second electrode 104b are different layers, and the shape of the second electrode 104b resembles a conventional pixel electrode, such as a square and plain shape. From a vertical perspective, the second electrode 104b would overlap the first electrode 104a, and the second electrode 104b alone covers substantially all the area of the LC layer 100 to ensure a high aperture ratio. Moreover, when incorporated into the LCD 10 of FIG. 2a, the second electrode 104b can be simply a square of 35 μm×35 μm. Thus, the second area 100b includes at least a part of the area of the LC layer 100 that the first area 100a does not include. Also that part of the area of the LC layer 100, included by the second area 100b, has at least two parts extending in different horizontal and perpendicular directions.

Figure 8A:
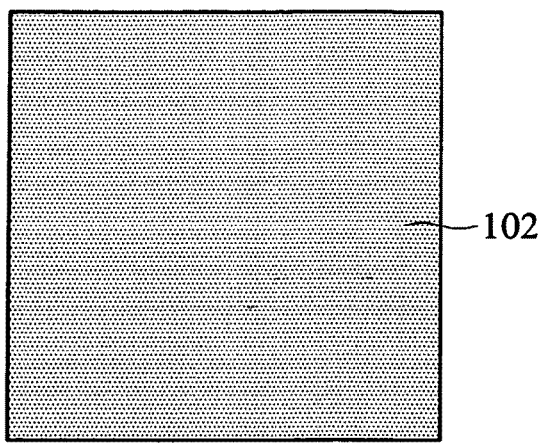
FIG. 8a-c show a combination of common electrode (a) and set of electrodes (b) and (c) according to a second embodiment of the invention.
Figure 8B:
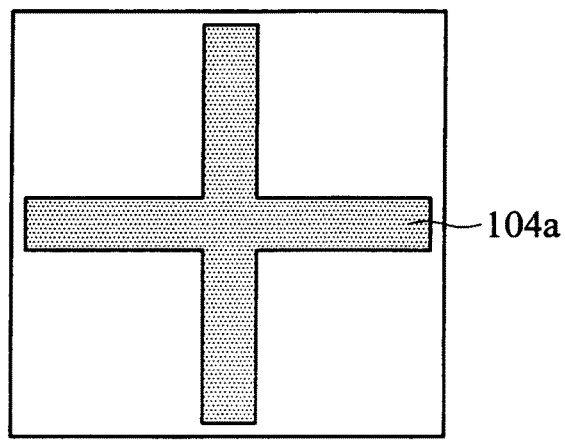
Figure 8C:
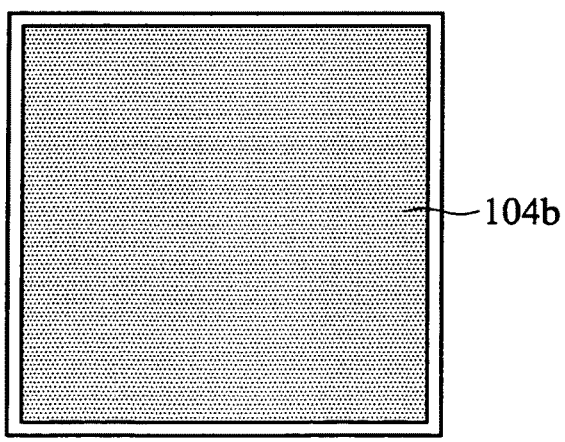

FIG. 8a-c show a combination of common electrode and set of electrodes according to a second embodiment of the invention. FIG. 8a shows the common electrode 102, FIG. 8b shows the first electrode 104a of the set of electrodes and FIG. 8c shows the second electrode 104b of the set of electrodes. In this embodiment, the first electrode 104a has the shape of a cross.

Figure 9A:
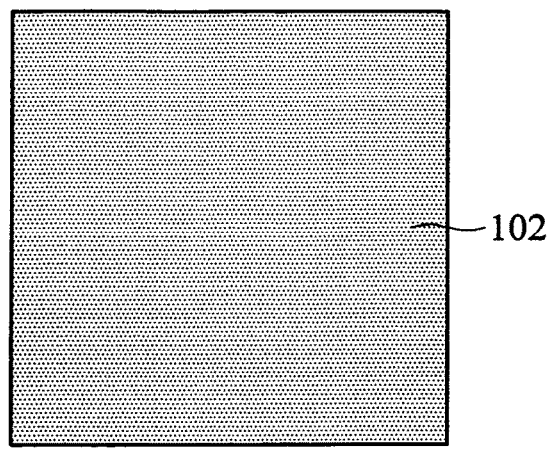
FIG. 9a-c show a combination of common electrode and set of electrodes according to a third embodiment of the invention.
Figure 9B:
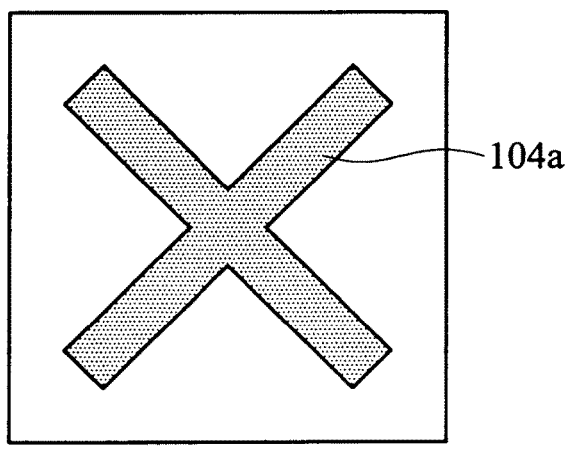
Figure 9C:
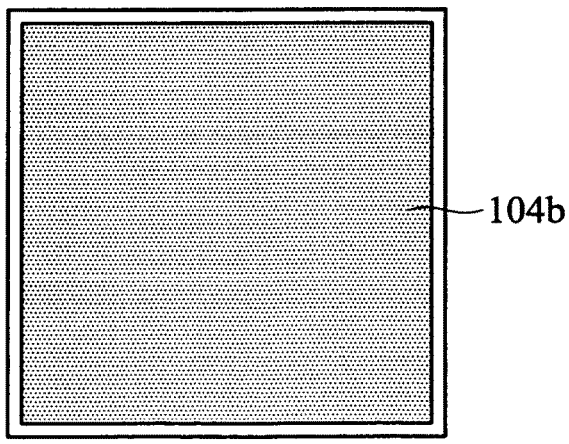

FIG. 9a-c show a combination of common electrode and set of electrodes according to a third embodiment of the invention. In this embodiment, the first electrode 104a has the shape of a multiplication sign or the cross shown in FIG. 8b rotated by 45 degrees. When using linear polarizers, this embodiment has the advantage over the embodiment shown in FIG. 8 in that the orientation of the LC molecules is in a direction of 0 and 90 degrees, which is in favour when the LCD 10 is viewed by a human wearing polarized glasses. The viewer of the display in the vertical or horizontal direction will see similar display content.

Figure 10:
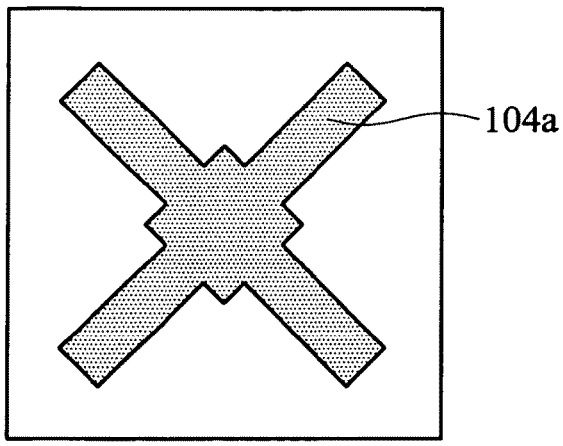
FIG. 10 shows another embodiment of the first electrode.

FIG. 10 shows another embodiment of the first electrode 104a, which corresponds to the shape of the first electrode in the first embodiment rotated by 45 degrees.

Figure 11:
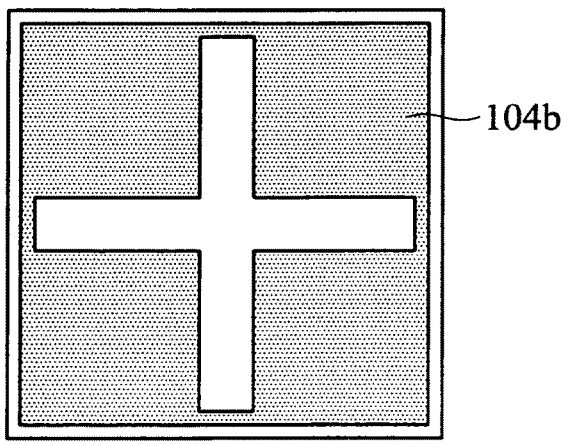
FIG. 11 shows another embodiment of the second electrode.

FIG. 11 shows an embodiment wherein the shape of a hole or opening in the second electrode 104b corresponds to the shape of the first electrode 104a as shown in FIG. 8B. In this case, the second electrode 104b alone does not cover all of the area of the LC layer 100 in the cell, and the second electrode 104b does not overlap the first electrode 104a either. Now, the first electrode 104a and the second electrode 104b together cover substantially all the area of the LC layer 100 to maintain a high aperture ratio. Moreover, when incorporated into the LCD 10 of FIG. 2a, both the first electrode 104a and the second electrode 104b are placed within a square 35 μm×35 μm. The high aperture ratio will remain as long as the second electrode 104b has one or more openings which coincide with the area covered by the first electrode 104a. Any second electrode 104b having opening coinciding with at least a part of said first electrode 104a and an area not covered by said first electrode 104a, will improve the aperture ratio of the LCD 10 compared to an LCD device with only an electrode at said side of the LC-layer 100.

Referring back to FIG. 2a, the first electrode 104a and the second electrode 104b are separated by a dielectric layer 104c, e.g., a layer of SiOx or SiNx. When applied to the same voltage, the first electrode 104a and the second electrode 104b in this arrangement can provide different capacitances in cooperation with the common electrode 102, and thus generate different switching effects providing the alignment of the LC molecules in four directions (2 orthogonal directions) and therefore allow us the use of linear polarizers in such a configuration.

The first electrode 104a and the second electrode 104b can be patterned by photolithographic and wet etching processes, and may not be limited to transmitting electrodes. Note that in FIG. 2a and 2b, the first electrode 104a is placed above the second electrode 104b, but in another embodiment, the first electrode 104a can be placed underneath the second electrode 104b (i.e., the first electrode 104a becomes closer to the substrate 130 on which the electrodes are etched), as long as the second electrode 104b would not shield the electric field of the first electrode 104a. This is the case when the second electrode 104b has an opening that has an area that coincides at least with the first electrode 104a.

Figure 2C:
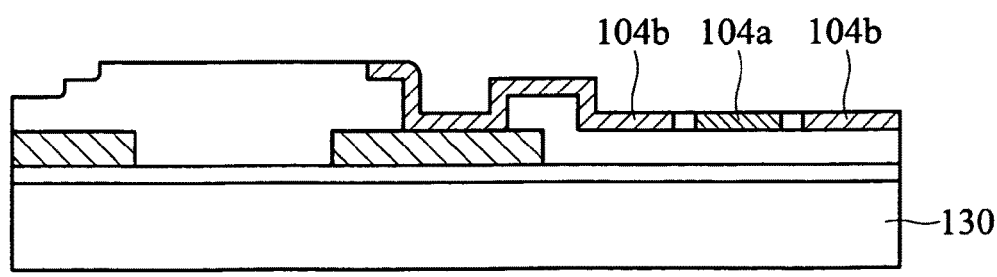
FIG. 2*c* exemplarily shows a profile of components of an LCD pixel cell according to another embodiment.
Figure 3A:
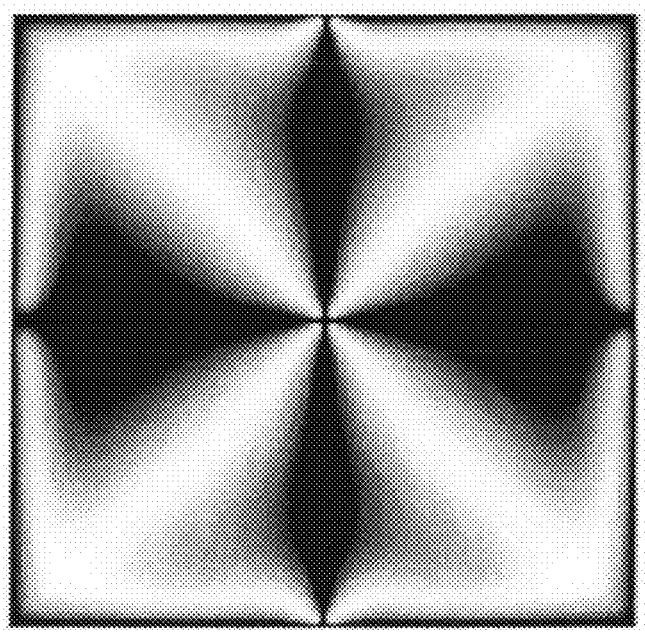
FIG. 3*a* shows the simulated optical response of a 45 μm pixel between crossed polarizers 0°-90°.
Figure 3B:
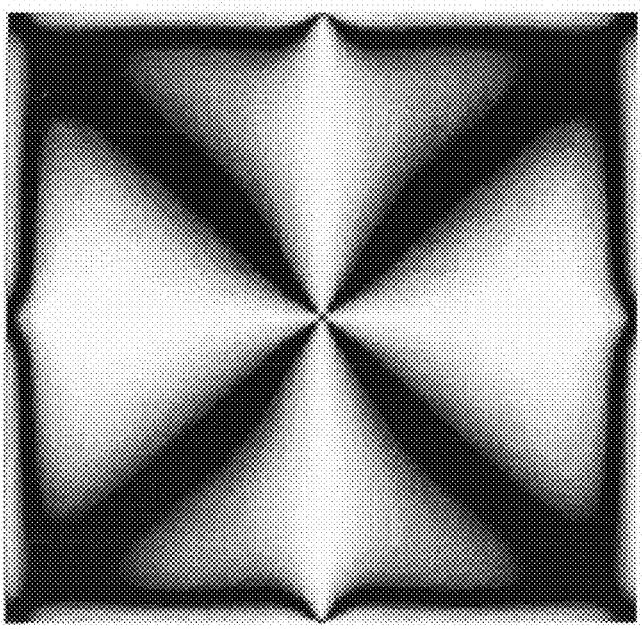
FIG. 3*b* shows the simulated optical response of a 45 μm pixel between crossed polarizers 45°-135°.
Figure 3C:
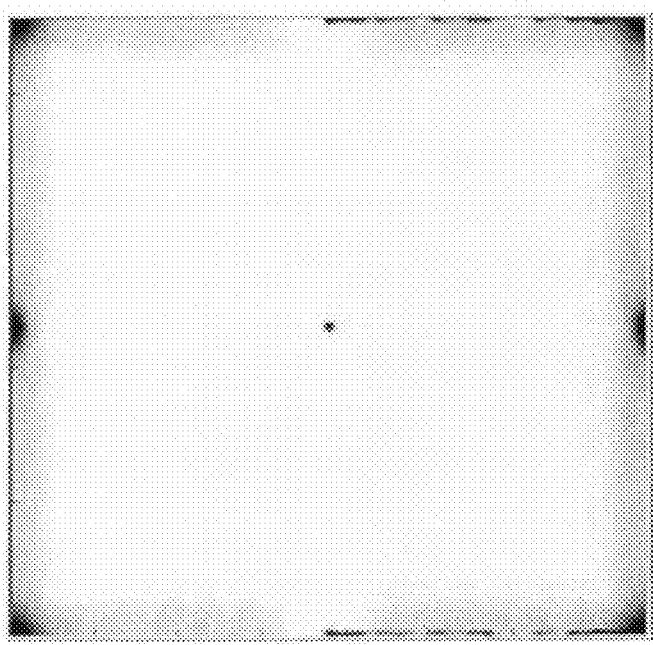
FIG. 3*c* shows the simulated optical response of a 45 μm pixel between circular polarizers.
Figure 3D:
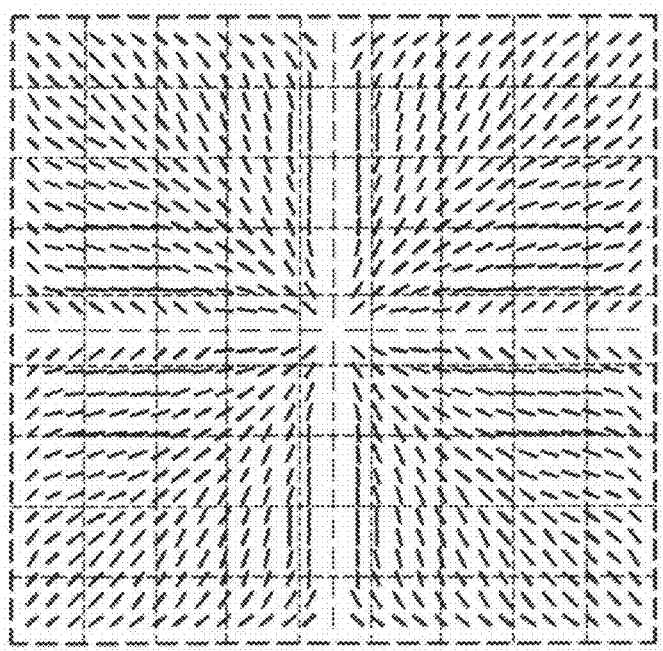
FIG. 3*d* shows the director profile of the LC molecules in a prior art 45 μm pixel in the centre of the cell.
Figure 4A:
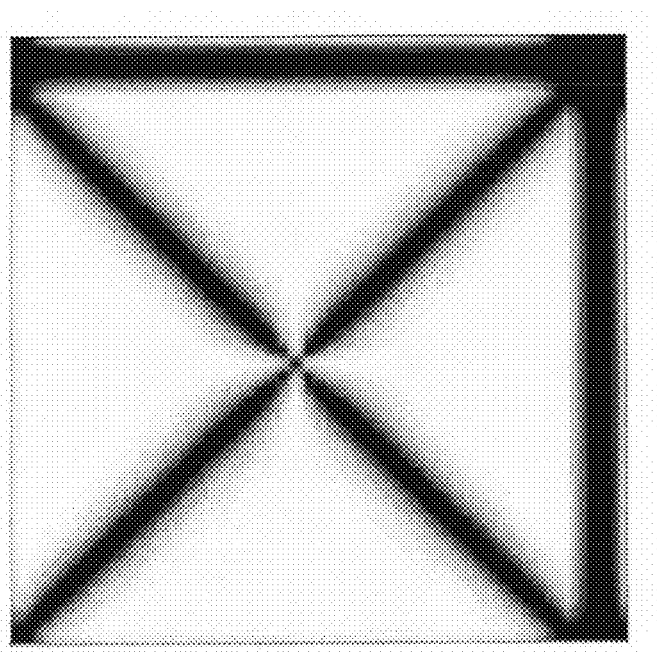
FIG. 4*a*-4*d* show respectively the simulated optical response of a 100 μm, 60 μm, 45 μm pixel and 25 μm between crossed polarizers 45°-135°.
Figure 4B:
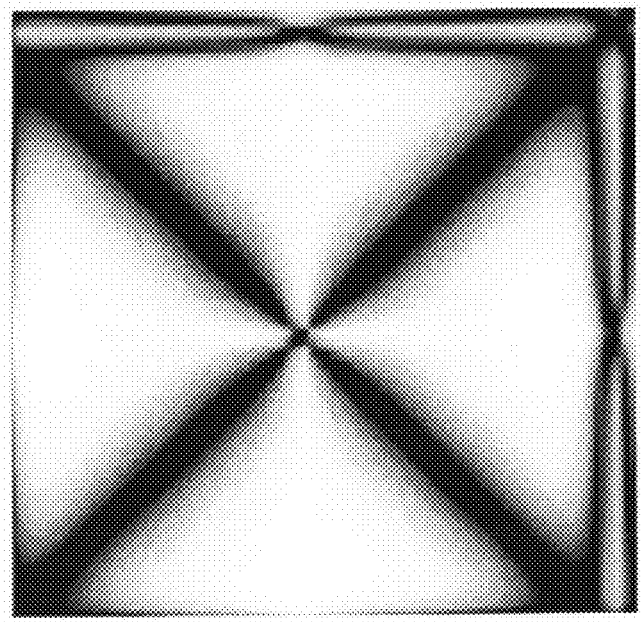
Figure 4C:
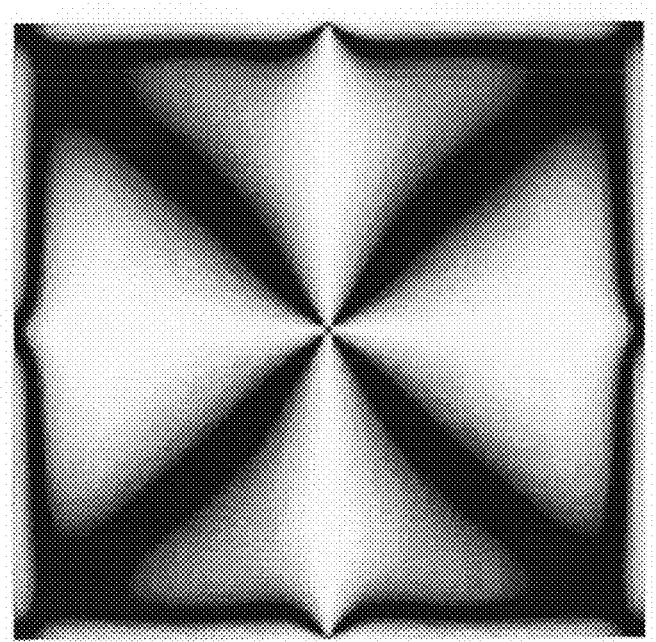
Figure 4D:
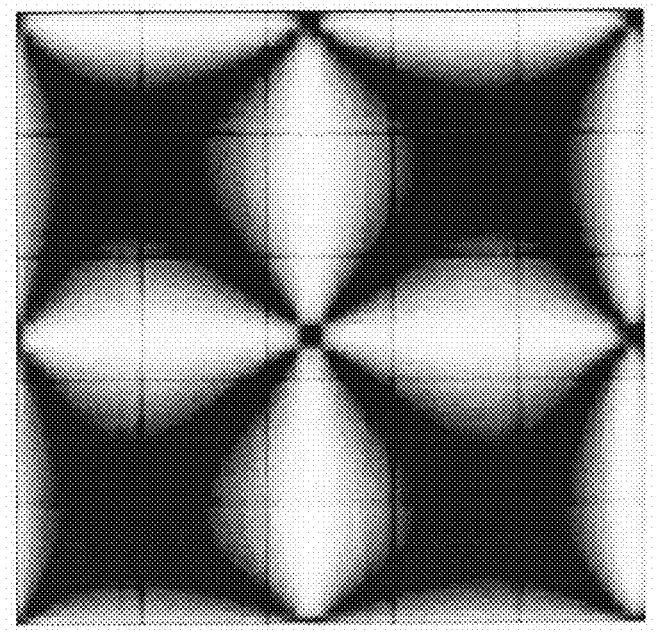
Figure 5A:
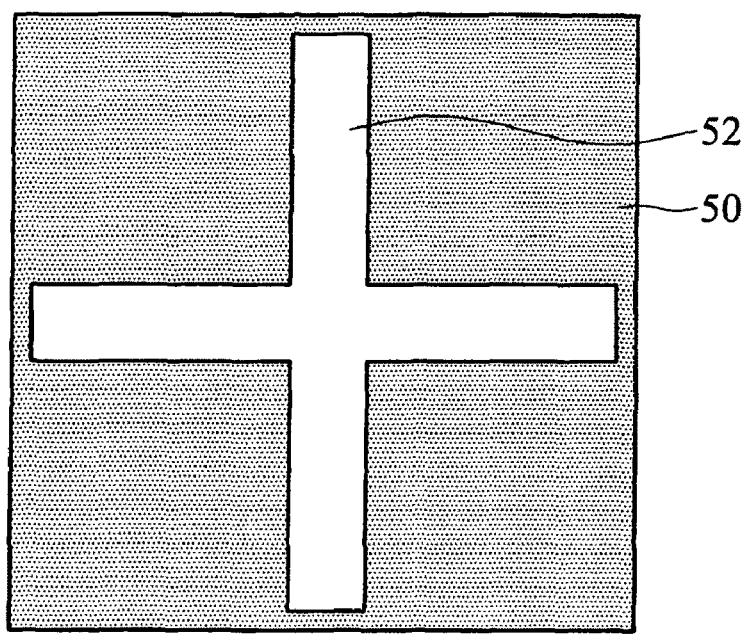
FIG. 5*a* shows an embodiment of an ITO hole on CF side.
Figure 5B:
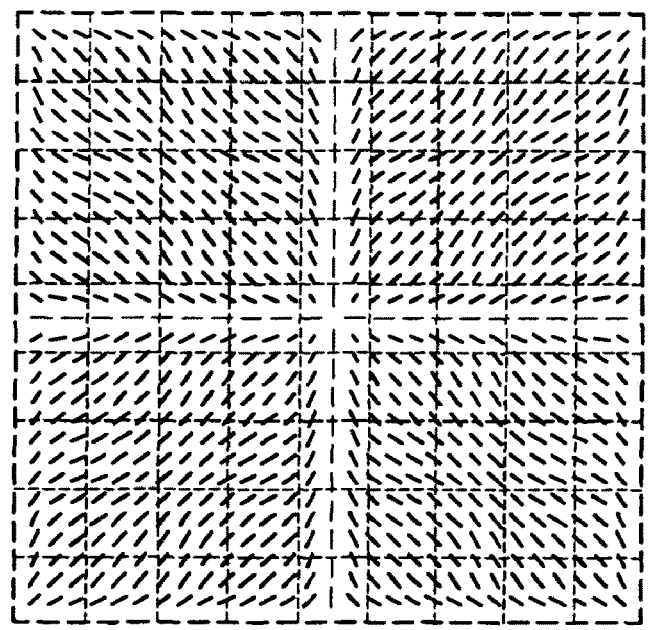
FIG. 5*b* shows the director profile of the LC molecules in a prior art cell with ITO hole on CF side.
Figure 5C:
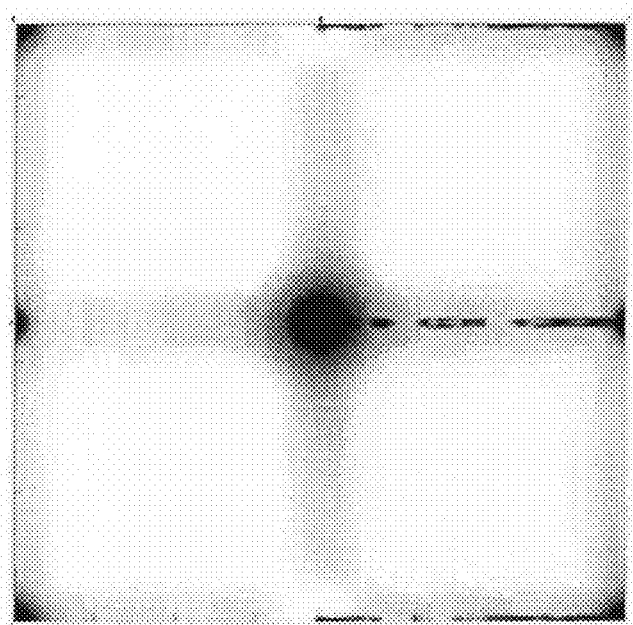
FIG. 5*c*-*d* show the optical response of a prior art cell with ITO hole on CF side between circular polarizers and crossed polarizers 0°-90°, respectively.
Figure 5D:
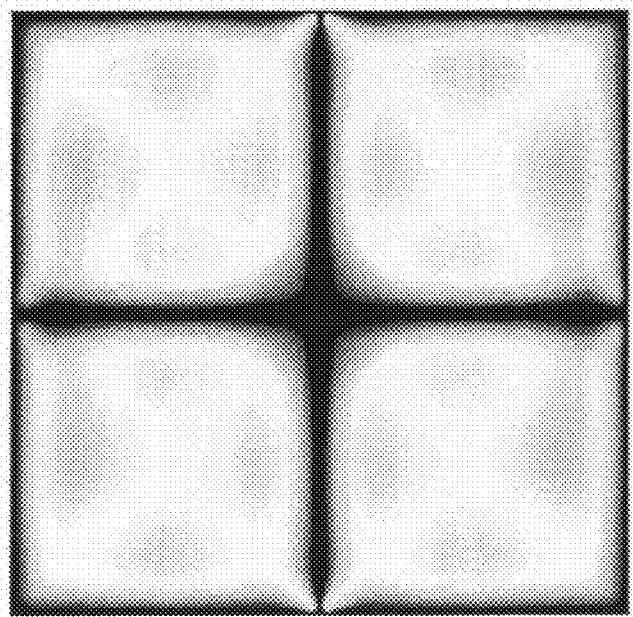
Figure 12:
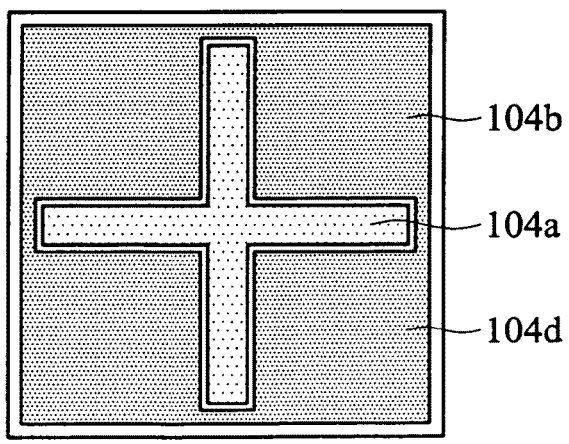
FIG. 12 shows the first electrode and the second electrode on the same plane according to an embodiment of the present invention.

FIG. 2c and FIG. 12 show another embodiment of the electrode set. In this embodiment, the first electrode 104a is similar to the first electrode in FIG. 8b and the second electrode 104b has an opening to encompass the first electrode 104a without making electrical contact. In this embodiment the first electrode 104a and second electrode 104b are on the same plane above the substrate 130, as shown in FIG. 2c. The second electrode 104b has an opening corresponding to a shape of the first electrode 104a. Advantage is that the first electrode 104a and the second electrode 104b can be formed at the same time in a photolithography process. And by being independently driven, the first electrode 104a and the second electrode 104b on the same plane can create different switching effect from the conventional single pixel electrode, while still preserving a high aperture ratio. In this embodiment, the driving unit 30 shown in FIG. 1, should supply different voltages to the first electrode 104a and second electrode 104b, to provide the fringing fields in the LC-layer 100. A small stripe 104d along the area covered by the first and second electrodes forms a boundary between the sets of electrodes of neighboring pixel cells.

Figure 13A:
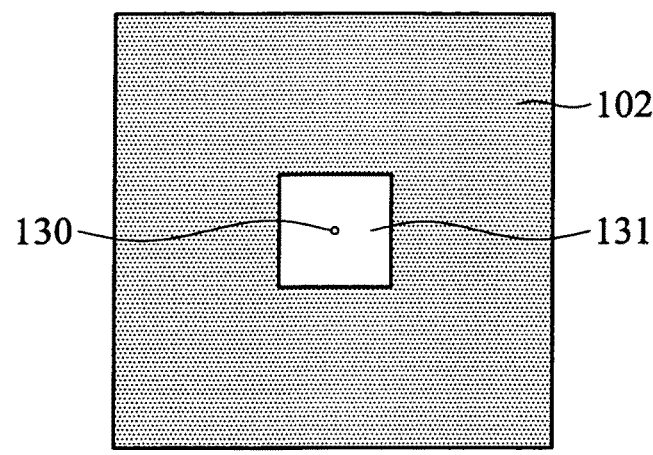
FIG. 13a-c show a combination of common electrode and set of electrodes according to a fourth embodiment of the invention.
Figure 13B:
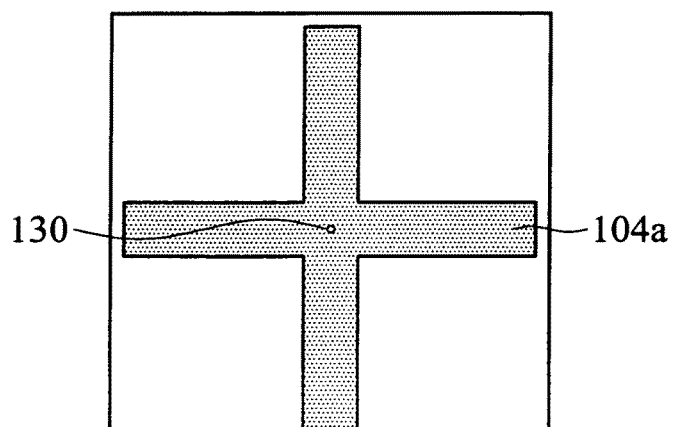
Figure 13C:
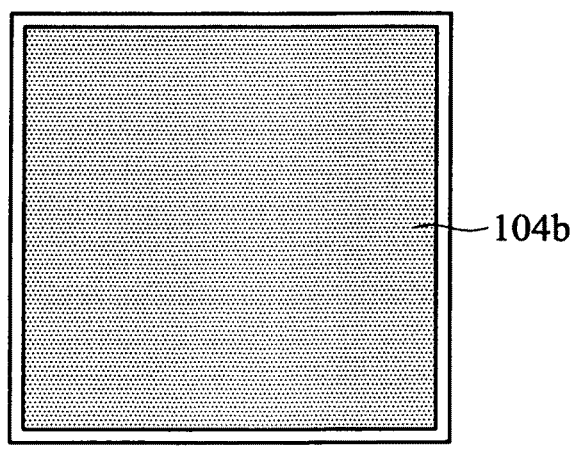

FIG. 13a-c show a combination of common electrode and set of electrodes according to a fourth embodiment of the invention. In this embodiment the LC alignment is obtained by combination of the common electrode 102 of the CF side and the set of electrodes. The fourth embodiment differs from the embodiment shown in FIG. 8 in that the common electrode 102 comprises an opening 131. The centre 131 of the opening coincides with the centre 132 of the cross shaped first electrode 104a as shown in FIG. 13b. FIG. 13c shows an embodiment of a corresponding second electrode 104b. This embodiment will provide similar optical properties as the embodiment shown in FIG. 7.

Figure 14A:
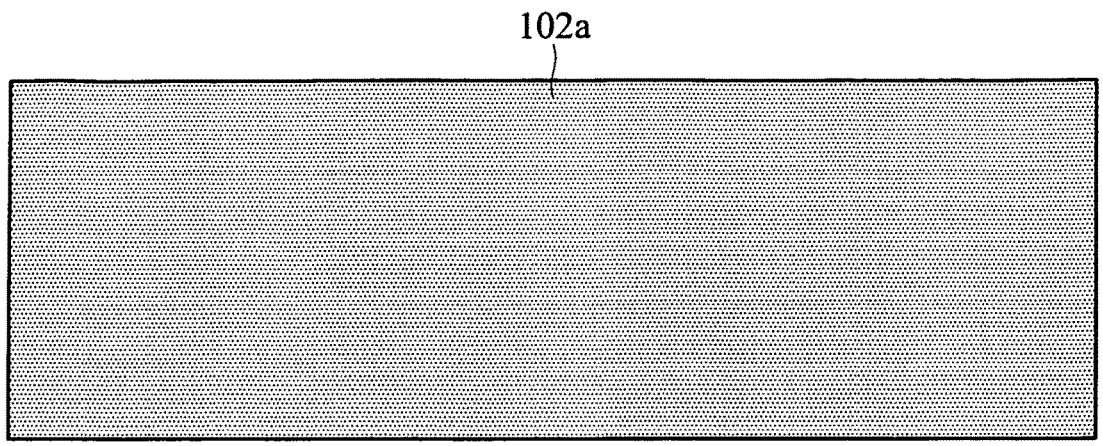
FIG. 14a-c show a combination of common electrode and set of electrodes according to a fifth embodiment of the invention.
Figure 14B:
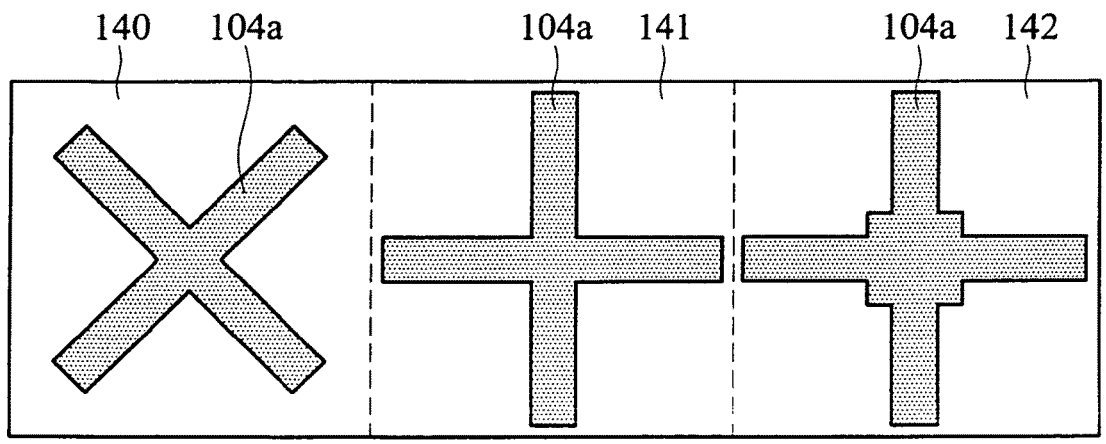
Figure 14C:
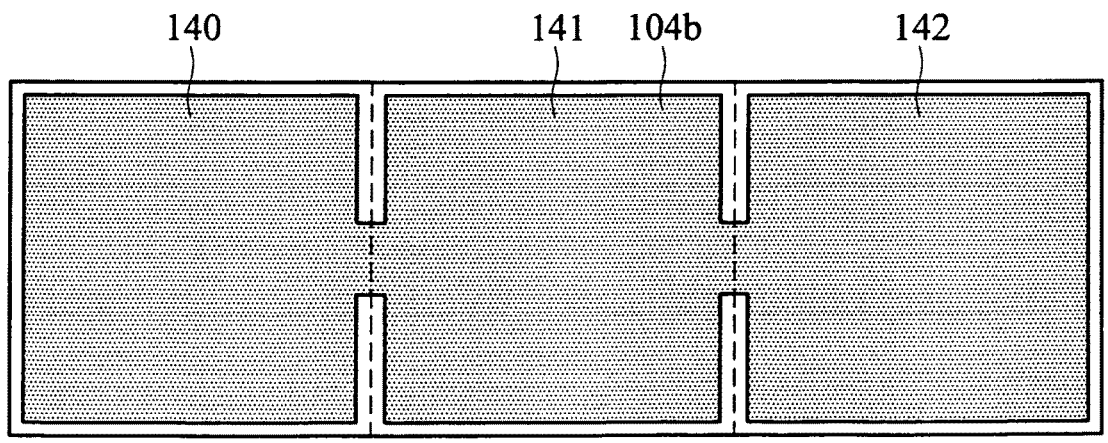

FIG. 14a-c show a combination of common electrode and set of electrodes according to a fifth embodiment of the invention. In this embodiment the LC-cell is a rectangle and not a square design as in the previous embodiments. The LC-cell comprises three squared sections 140, 141, 142. In FIG. 14a is shown the common electrode 102. In FIG. 14b is shown the first electrode 104a of the set of electrodes and in FIG. 14c is shown the second electrode 104b. In this embodiment, each section comprises a differently shaped first electrode. This could be used to improve the off-axis characteristics and to provide one cell with different polarizing directions.

Figure 15A:
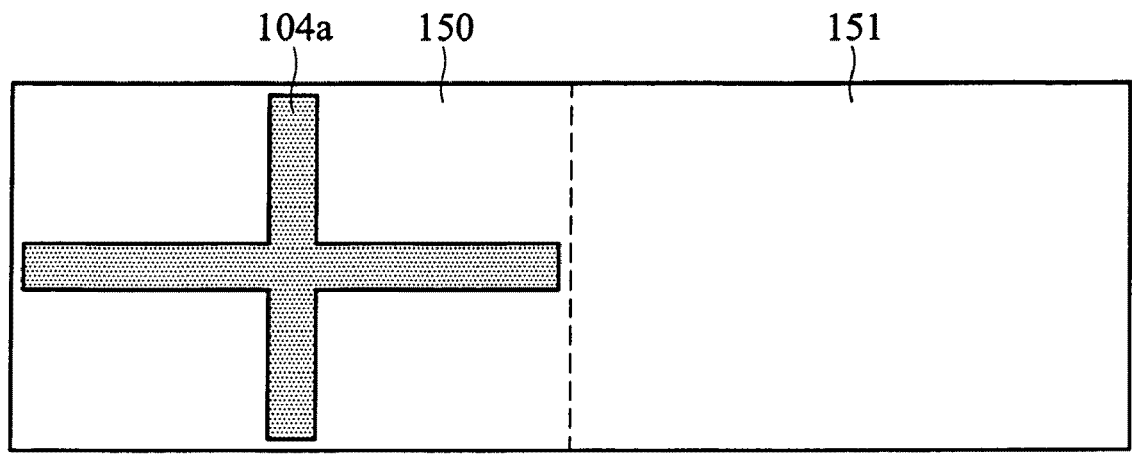
FIG. 15a shows an embodiment of the first electrode for use in a transflective LCD.
Figure 15B:
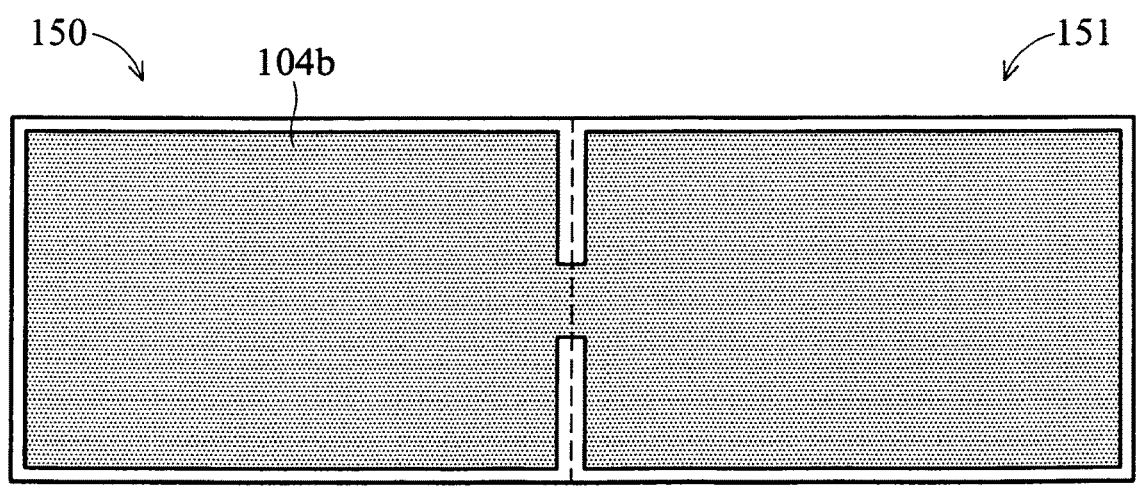
FIG. 15b shows an embodiment of the second electrode for use in a transflective LCD.

FIG. 15a shows an embodiment of the first electrode for use in a transflective LCD. In such an embodiment the transmissive part 150 of the LC-cell comprises a common electrode and a set of electrodes and the reflective part 151 of the LC-cell comprises the common electrode and one other electrode. An embodiment of a combination of the other electrode of the reflective part 151 and the second electrode 104b of the transmissive part 150 is shown in FIG. 15b. Preferably, the transmissive part 150 of the LC-layer is between linear polarizers and the reflective part 151 of the LC-layer is between circular polarizers.

While this invention has been described with reference to the illustrative embodiments, these descriptions should not be construed in a limiting sense. Various modifications of the illustrative embodiment, as well as other embodiments of the invention, will be apparent upon reference to these descriptions. It is therefore contemplated that the appended claims will cover any such modifications or embodiments as falling within the true scope of the invention and its legal equivalents.

What is claimed is:

1. A liquid crystal display device (LCD), comprising:
   a liquid crystal layer, comprising liquid crystal (LC) molecules;
   a common electrode;
   an electrode set for switching said liquid crystal layer, wherein said liquid crystal layer is placed between said common electrode and said electrode set, and said electrode set comprises:
   a first electrode provided for switching a first area of said liquid crystal layer; and
   a second electrode provided for switching a second area of said liquid crystal layer;
   wherein said second area includes at least a part of the area of said liquid crystal layer that said first area does not include,
   wherein the first electrode has a shape which in cooperation with the second electrode allows alignment of the LC molecules in two substantially orthogonal directions, wherein said first electrode has a shape corresponding to a combination of a cross shape and a rectangular shape, and wherein the centers of the cross shape and rectangular shape coincide.

2. The LCD device according to claim 1, wherein said second electrode has a rectangular shape.

3. The LCD device according to claim 1, wherein said first electrode and said second electrode together cover substantially the entire area of a pixel cell defined in said liquid crystal layer.

4. The LCD device according to claim 1, wherein said first electrode and said second electrode are separated by a dielectric layer.

5. The LCD device according to claim 1, wherein the LCD device further comprises a driver unit for driving said first electrode and said second electrode.

6. The LCD device according to claim 5, wherein said first electrode and said second electrode are driven with different voltages.

7. The LCD device according to claim 1, wherein the LCD device comprises two or more sections and the common electrode and the first and second electrodes extend to allow alignment of the LC molecules in each of said one or more sections in two substantially orthogonal directions, wherein the shape and/or orientation of the first electrode in the two or more sections differ.

8. The LCD device according to claim 1, wherein the LCD device is a transmissive LCD device and linear polarizers are disposed respectively on both outer surfaces of the LCD device, having polarization axes that are orthogonal to each other.

9. An electronic device, comprising:
the LCD device according to claim 1;
a power supply connected to the LCD device to supply power to the LCD device.

10. A liquid crystal display device (LCD), comprising:
a liquid crystal layer, comprising liquid crystal (LC) molecules;
a common electrode;
an electrode set for switching said liquid crystal layer, wherein said liquid crystal layer is placed between said common electrode and said electrode set, and said electrode set comprises:
a first electrode having a first shape extending symmetrically in two orthogonal directions with respect to a first center, said first electrode provided for switching a first area of a pixel of said liquid crystal layer; and
a second electrode having a second shape extending symmetrically in two orthogonal directions with respect to a second center, said second electrode provided for switching a second area of said pixel of said liquid crystal layer;
wherein said second area includes at least a part of the area of said pixel of said liquid crystal layer that said first area does not include, wherein the shape of the first electrode cooperates with the shape of the second electrode to allow alignment of the LC molecules in two substantially orthogonal directions, wherein the first shape corresponds to a combination of a cross shape and a rectangular shape, and wherein the centers of the cross shape and the rectangular shape coincide in plan view.

11. The LCD device according to claim 10, wherein the second shape is a rectangular shape.

* * * * *